June 11, 1929.  M. M. FARMER  1,716,519
PISTON ROD PACKING RING
Filed Dec. 21, 1923
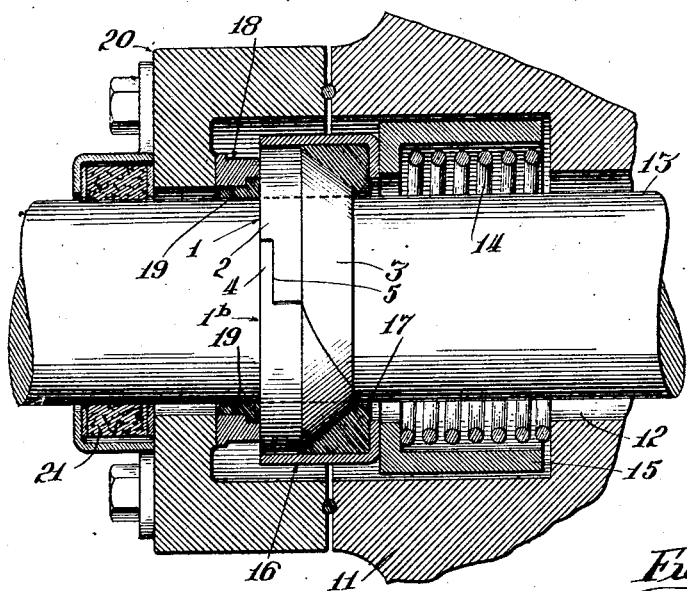
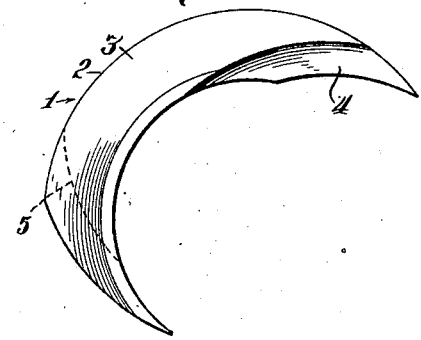
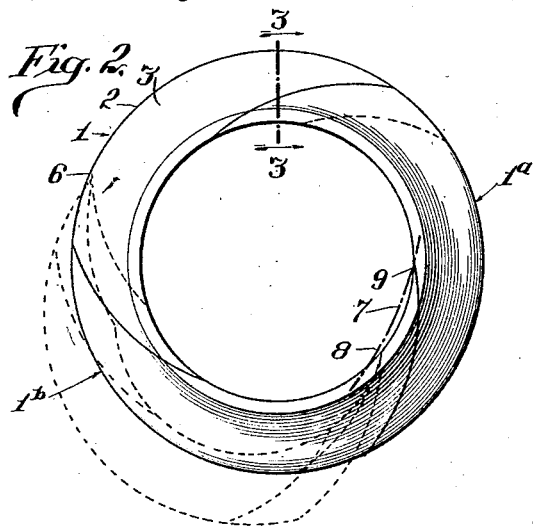
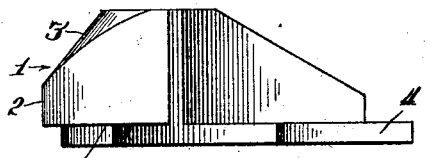
Inventor
Melvin M. Farmer
Attorney Patented June 11, 1929.

1,716,519

UNITED STATES PATENT OFFICE.

MELVIN M. FARMER, OF BLUE ISLAND, ILLINOIS.

PISTON-ROD PACKING RING.

Application filed December 21, 1923. Serial No. 681,961.

This invention relates to metallic packing rings for the piston rods of engine and pump cylinders and particularly to the particular type of sectional packing rings known as locomotive piston-rod packings.

The particular objects and advantages of the present invention are principally twofold in that they comprehend a packing ring structure of the sectional type wherein the joints between the ring sections are so overlapped as to require that the fluid under pressure within the cylinder which may find its way into such a joint, to flow in zig-zag directions at sharp angularity to each other in order to find its way through said joint and wherein, furthermore, the several sections are so relatively arranged as to render the completed ring self-retaining upon the piston-rod without requiring that the several sections be held together by any agency other than their engagement with each other and the piston rod upon which they are mounted. This last condition is very advantageous from the stand-point of handling and manipulation in that it effects saving of time and also injury to the several sections resulting from dropping the same.

The first-mentioned object and advantage takes cognizance of that law of physics relating to flow of fluids whereby sharp turns in direction of flow occasions such resistance as will materially decrease leakage.

A suitable embodiment of the invention is illustrated in the accompanying drawings wherein:—

Fig. 1 is a central longitudinal section of the stuffing box of a steam-engine or pump cylinder equipped with a piston-rod packing constructed in accordance with the invention.

Fig. 2 is an end elevation of the packing ring.

Fig. 3 is a fragmentary detail radial section of the same on the line 3—3 of Fig. 2.

Fig. 4 is an end elevation, and

Fig. 5 is a side elevation, of one section of the ring.

The ring of my invention is preferably composed of three equal sections 1, 1ª and 1ᵇ this number being more advantageous than a smaller or larger number for reasons hereinafter particularly pointed out. The inner face of the complete ring is cylindrical and the outer face thereof includes a cylindrical portion 2 and a tapered portion 3. In radial section between joints the ring of my invention is practically identical with those commonly used and in end elevations its appearance is also practically identical with the rings commonly used, the meeting ends of the several sections being arcuate and eccentric to the axis of the ring.

The essentially novel features of the ring reside in part in the exact relation of the arcuate joints with respect to the ring axis and in part in the details of construction of the several sections whereby the joint is rendered more fluid-tight and the several sections are rendered incapable of relative movement in the direction of the ring axis.

Referring particularly to Figs. 4 and 5, it will be noted that each section 1 terminates at one end in a projecting flange 4 and at its other end is provided with a recess 5 conforming in shape and size with the flange 4 and adapted to receive such flange of the adjacent section 1. The flange 4 has one face preferably flush with the larger end-face of the section and its other face parallel therewith, while its free end preferably describes an arc of smaller radius than, and eccentric with the arc of the main portion of the joint between two of said sections, the depth of the flange 4 being preferably less than the length of the outer cylindrical wall 2 of the ring in order that the last-named surface of said flange may have the maximum dimension radially of the ring.

Upon fitting two of said sections 1 together the interfitting of the flanges 4 and recesses 5 will obviously prevent relative movement of said sections in one direction, namely, that parallel with the axis thereof, and upon completing the ring by adding the third section, such relative movement is prevented in the opposite direction also. It will be obvious, however, that the third section must be slipped into place by a swinging movement in a plane parallel with its end faces and more or less radially inwardly of the ring. In fact, by first positioning the extreme point of the flange 4 in contact with the point 6 at which the inner arcuate face of the recess 5 of an adjacent section meets the outer cylindrical face of its wall and then turning the last section substantially on this point 6 of contact, its other arcuate end will be comparaively easily swung into place, a very slight forcing or springing into place being required.

In swinging the third section into place on the fulcrum point 6, the other extreme end of the section will strike the surface of the piston rod, as shown in dotted lines in Fig. 2, so that the inner face of said section is then eccentric to the rod. Further swing from this point causes the section to travel a very short distance around the piston rod and the fulcrum edge of the section to move away from the point 6 along the arcuate shoulder forming the inner wall of the recess in the adjacent section. During this travel the arcuate end surfaces of the third section strike the extreme opposed points or ends of the other of the first two sections, thus resisting the said travel.

It will be observed that the total arcuate length of each section is greater than one hundred and twenty degrees by the length of the flange 4. If, as shown in dotted lines (Fig. 2), an arc 7 is drawn having its axis in the point 6 and intersecting the point 8 at which the other extreme end of the section lies normally in contact with the rod, it will be apparent that in swinging the third section 1$^b$ into place from the position shown in dotted lines in Fig. 2, its extreme end 9 must ride over the arcuate surface of the rod between the points 8 and 9 at the same time that the overlapping end portion of the section 1$^a$ is forced very slightly outwardly.

While it does not appear to be demonstrable on paper that the completed ring is self-sustaining, except upon the theory that the outward movement or swing of the extreme or overlapping end portion of one section is resisted by the similar end portion of the next adjacent section and working back to the third section, it is nevertheless true that after the ring is completely assembled about the piston rod, the latter may horizontally be disposed and rotated without disturbing the assembly of said ring.

When so assembled, the ring presents three shouldered joints or offset joints requiring escaping fluid entering the same to turn at right-angles twice during its travel through the joint and this renders said joints far more fluid-tight than is true of those that do not present the offsets.

Fig. 1 is merely an illustration of an exemplary installation of a packing ring of the type to which the invention relates and includes the end-wall or head 11 of the cylinder through the central opening 12 of which the piston rod 13 projects, said opening having an annularly enlarged mouth portion housing the compression spring 14 and preventer 15 which bears against the retainer 16 containing the retainer half-pieces 17 against which the tapered face of the packing ring bears. The other end face of the latter bears upon the sliding plate ring 18 which together with its half-pieces 19 is held in place by the gland 20 which carries the swab 21.

It will be understood that the invention is not limited to the number nor to the specific details of construction of the packing-ring sections shown and described as these may be changed and varied at will within the definition of the appended claims without departing from the inventive concept.

I claim as my invention:

1. A packing ring having an inner cylindrical bore adapted to snugly fit a piston-rod and the like and comprising a plurality of equal arcuate sections, each of said sections having a projecting element at one end and a corresponding recess in its other end for receiving the projecting element of a contiguous section and vice versa, said recesses and projecting elements each having a plurality of eccentric arcuate end surfaces disposed upon different axes within the bore of the ring to thereby effect overlapping of one section upon the next contiguous section, in a manner preventing a relative separating movement of said sections outwardly from the axis thereof.

2. A piston-rod packing comprising a ring composed of a plurality of equal sections having arcuate meeting faces the axes of which are disposed within the bore of the ring, the said meeting faces including interfitting projections and recesses radially coextensive with the thickness of the ring and adapted to prevent relative movement of the sections longitudinally of the ring axis, said meeting-faces so engaging each other when said sections surround an associated piston rod as to mutually hold one another against automatic dissembling by gravity.

3. A packing ring having an inner cylindrical bore adapted to snugly fit a piston rod and the like, and comprising a plurality of equal arcuate sections, all of the sections being formed substantially identical, each of said sections having a projecting flange at one end and a corresponding recess at its other end for receiving the projecting flange of a contiguous section and vice versa, the flange having one face preferably flush with the larger end face of the section and its other face parallel therewith, with its free end describing an arc of smaller radius than and eccentric with the arc of the main portion of the joint between two of said sections, with the depth of the flange being preferably less than the length of the outer cylindrical wall of the completed ring whereby the last named surface of said flange may have the maximum dimension radially of the ring.

In testimony whereof, I have hereunto set my hand, this 18th day of December, 1923.

MELVIN M. FARMER.